(12) United States Patent
Miloiicic et al.

(10) Patent No.: US 6,851,074 B2
(45) Date of Patent: Feb. 1, 2005

(54) SYSTEM AND METHOD FOR RECOVERING FROM MEMORY FAILURES IN COMPUTER SYSTEMS

(75) Inventors: Dejan S. Miloiicic, Palo Alto, CA (US); Thomas Wylegala, Santa Clara, CA (US); Fong Pong, Mountain View, CA (US); Stephen Hoyle, Palo Alto, CA (US); Lance W. Russell, Hollister, CA (US); Lu Xu, San Jose, CA (US); Alberto J. Munoz, Los Altos, CA (US)

(73) Assignee: Hewlett-Packard Development Company, Houston, TX (US)

( * ) Notice: Subject to any disclaimer, the term of this patent is extended or adjusted under 35 U.S.C. 154(b) by 571 days.

(21) Appl. No.: 09/845,469

(22) Filed: Apr. 30, 2001

(65) Prior Publication Data

US 2002/0162050 A1 Oct. 31, 2002

(51) Int. Cl.[7] ............................................... G06F 11/00
(52) U.S. Cl. ......................................... 714/20; 711/159
(58) Field of Search ................................ 714/20, 21, 13, 714/7, 8, 16, 5, 6, 27, 37, 38, 47, 48; 711/159, 133, 134; 710/17, 18, 48, 49; 712/244, 245

(56) References Cited

U.S. PATENT DOCUMENTS

| | | | | |
|---|---|---|---|---|
| 4,174,537 A | * | 11/1979 | Chu et al. ..................... | 714/48 |
| 4,371,949 A | * | 2/1983 | Chu et al. ..................... | 714/52 |
| 4,811,347 A | * | 3/1989 | Bolt ............................ | 714/805 |
| 5,261,084 A | * | 11/1993 | Hashiguchi et al. ........... | 714/49 |
| 5,428,766 A | * | 6/1995 | Seaman ........................ | 709/215 |
| 5,644,709 A | * | 7/1997 | Austin .......................... | 714/53 |
| 5,867,642 A | * | 2/1999 | Vivio et al. ................... | 714/8 |
| 5,953,530 A | * | 9/1999 | Rishi et al. ................... | 717/127 |
| 6,505,305 B1 | * | 1/2003 | Olarig ........................... | 714/5 |

* cited by examiner

*Primary Examiner*—Naseem Iqbal
(74) *Attorney, Agent, or Firm*—Lloyd E. Dakin, Jr.

(57) ABSTRACT

The present invention is a system and method for recovering from memory failures in computer systems. The method of the present invention includes the steps of: identifying a predetermined instruction sequence; monitoring for memory access errors in response to the request; logging a memory access error in an error logging register; polling the register for any logged memory access error during execution of the instruction sequence; and raising exceptions, if the memory access error is logged. Within the system of the present invention, memory access errors are stored in an error logging register, machine check abort handles are masked, and memory controllers are under full control of the software so that memory access errors can be intercepted and responded to without necessitating a system reboot or application restart. The present invention is particularly applicable to O/S code which can not otherwise recover from memory errors except by rebooting.

25 Claims, 4 Drawing Sheets

SYSTEM AND METHOD FOR RECOVERING FROM MEMORY FAILURES IN COMPUTER SYSTEMS

BACKGROUND OF THE INVENTION

1. Field of the Invention

The present invention relates generally to systems and methods for recoverable programming, and more particularly to a recoverable programming system and method for memory system failures in multi-processor computer systems.

2. Discussion of Background Art

Demand for increased performance and high availability of commodity computers is increasing with the ubiquitous use of computers and the Internet services which serve them. While commodity systems are tackling the performance issues, availability has received less attention. It is a common belief that software (SW) errors and administration time are, and will continue to be, the most probable cause of the loss of availability. While such failures are clearly commonplace, especially in desktop environments, it is believed that certain other hardware (HW) errors are also becoming more probable.

Processors, caches, and memories are becoming larger, faster and more dense, while being increasingly used in ubiquitous and adverse environments such as at high altitudes, in space, and in industrial applications. Articles, such as Ziegler, J. F., et al., "IBM Experiments in Soft Fails in Computer Electronics (1978–1994)", IBM Journal of R&D, vol 40, no 1, pp 3–18, January 1996, and Ziegler, J. F., "Terrestrial Cosmic Rays", IBM Journal of R&D, vol 40, no 1, pp 19–40, January 1996, have shown that these changes will lead to increased transient errors in CMOS memory due to the effects of cosmic rays, approximately 6000 FIT (1 FIT equals 1 failure in 10 9 h) for one 4 Mbit DRAM.

Tandem (see, Compaq Corporation, "Data Integrity for Compaq NonStop Himalaya Servers", White Paper, 1999) indicates that such errors also apply to processor cores or on-chip caches at modern die sizes/voltage levels. They claim that processors, cache, and main memory are all susceptible to high transient error rates. A typical processor's silicon can have a soft-error rate of 4000 FIT, of which approximately 50% will affect processor logic and 50% the large on-chip cache. Due to increasing speeds, denser technology, and lower voltages, such errors are likely to become more probable than other single hardware component failures. With the increasing evolution to larger tightly interconnected commodity machines (such as Sun's Enterprise 10000 machines), the probability of soft-errors and error containment problems increases further. Soft-error probability increases not only due to increased system scale, but also due to an increased number of components on the memory access path. Since the machines are tightly coupled, memory path soft-errors introduce error containment problems which without some form of soft-ware error containment can lead to complete loss of availability.

Techniques such as Error Correction Codes (ECC) and ChipKill (see, Dell, T. J., "A White Paper on the benefits of Chipkill Correct ECC for PC Server Main Memory", IBM Microelectronics Division, November 1997) have been used in main memories and interconnects to correct some of these errors (90% for ECC). Unfortunately such techniques, only help reduce visible error rates for semiconductor elements that can be covered by such codes (large storage elements). With raw error rates increasing with technological progress and more complicated interconnected memory subsystems, ECC is unable to address all the soft-error problems. For example, a 1 Gb memory system based on 64 Mbit DRAMs still has a combined visible error rate of 3435 FIT when using Single Error Correct Double Error Detect (SECDED) ECC. This is equivalent to around 900 errors in 10000 machines in 3 years. Unfortunately, current commodity hardware and software provide little to no support for recovery from errors not covered by ECC whether detected or not. Such problems have been considered by mainframe technology for years, but in the field of commodity hardware, it is currently not cost effective to provide full redundancy/support in order to mask errors. Therefore, the burden falls to commodity hardware and the software using it to attempt to handle these errors for the highest availability.

Most contemporary commodity computer systems, while providing good performance, pay little attention to availability issues resulting from such errors. For example, the IA-32 architecture supports only ECC on main memory rather than across the system, requiring system reboot on errors not covered by this ECC. Consequently, commodity software such as the OS, middleware and applications have been unable to deal with the problem. Future commodity processor architectures may provide support to detect and notify the system of such probable errors. For instance, upcoming IA-64 processors, while not recoverable in the general case, do offer some support with certain limitations.

Availability in computer systems is determined by hardware and software reliability. Hardware reliability has traditionally existed only in proprietary servers, with specialized redundantly configured hardware and critical software components, possibly with support for processor pairs (see, Bartlett, J., "A Nonstop Kernel", Proceedings of the Eighth Symposium on Operating Systems Principles, Asilomar, Ca, pp 22–29, December 1981), e.g. IBM S/390 Parallel Sysplex (see, Nick, J. M., et al., "S/390 Cluster Technology: Parallel Sysplex", *IBMSystems Journal*, vol 36, no 2., pp 172–201, 1997), and Tandem NonStop Himalaya (see, Compaq, Product description for Tandem Nonstop Kernel 3.0. Download February 2000, http://www.tandem.com).

Sysplex supports hot swap execution, redundant shared disk with fault-aware system software for error detection and fail-over restart. Tandem supports redundant fail-over lock-stepped processors with a NonStop kernel and middleware, which provide improved integrity through the software stack. These systems provide full automatic support to mask the effects of data and resource loss. They rely on reliable memory and fail-over rather than direct memory error recovery. Another approach is fault containment and recovery with "node" granularity. In these systems, each node has its own kernel. When one node fails, the others can recover and continue to provide services. Systems of this type include the early cluster systems (see, Pfister, G., "In Search of Clusters", Prentice Hall, 1998), and NUMA architectures, such as Hive (see, Chapin, J., et al., "Hive: Fault Containment for Shared Memory Multiprocessors," *Proc. of the 15th SOSP*, December 1995, pp 12–25, and Teodosiu, D., et al., "Hardware Fault Containment in Scalable Shared Memory Multiprocessors," *Proc. of the 24th ISCA*, pp 73–84, June 1997). Hardware faults are difficult to catch and repeat.

Software reliability has been more difficult to achieve in commodity software even with extensive testing and quality assurance. Commodity software fault recovery has not evolved very far. Most operating systems support some form of memory protection between units of execution to detect and prevent wild read/writes. But most commodity operating systems have not tackled problems of memory errors themselves or taken up software reliability research in general. Examples include Windows 2000 and Linux. They typically rely on failover solutions, such as Wolfpack by Microsoft. A lot of work has been undertaken in the fault-tolerant community regarding the problems of reliability and its recovery in software (see, Brown, N. S. and Pradhan, D. K. "Processor and Memory-Based Checkpoint And Roll-back Recovery", IEEE Computer, pp 22–31, February 1993; Gray, J., and Reuter, A., "Transaction Processing: Concepts and Techniques," Morgan Kaufmann, 1993; and Kermarrec, A M., et al., "A Recoverable Distributed Shared Memory Integrating Coherence and Recoverability", *Proc. of the 25th FTCS*, pp 289–298, June 1995).

These include techniques such as checkpointing and backward error recovery. A lot of this work has been conducted in the context of distributed systems rather than in single systems. There are also techniques for efficient recoverable software components, e.g. RIO file cache (see, Chen, P. M., et al., "The Rio File Cache: Surviving Operating System Crashes", *Proc. of the 7th ASPLOS*, pp 74–83, October 1996), and Recoverable Virtual Memory (RVM) (see, Satyanarayanan, et al. "Lightweight Recoverable Virtual Memory". Proc. SOSP, pp 146–160, December 1993).

Rio takes an interesting software-based approach to fault containment aimed at a fault-tolerant file cache, but with general uses. By instrumenting access to shared data structures with memory protection operations, wild access to the shared data structures becomes improbable.

Other methods for handling memory errors include a try-except block solution. In general, the try-except mechanism itself is not sufficient to handle memory failures. The saved state needed for memory failures is more extensive (as an example, for IA-64 architecture) than what can be obtained by try-except. Thus saving state is an expensive operation in terms of system overhead.

Since current responses to memory failures are costly to invoke and execute, do not guarantee recovery under all cases for next generation processors, such as IA64, and are impossible to recover at all for current generations of commodity processors, such as the IA32 family, what is needed is a system and method for recoverable programming that overcomes the problems of the prior art.

SUMMARY OF THE INVENTION

The present invention is a system and method for recovering from memory failures in computer systems. The method of the present invention includes the steps of: identifying a predetermined instruction sequence; monitoring for memory access errors in response to the request; logging a memory access error in an error logging register; polling the register for any logged memory access error during execution of the instruction sequence; and raising exceptions, if the memory access error is logged.

In other aspects of the invention, the method may include the steps of: checkpointing a predetermined set of system data; recovering from the memory access error using the checkpointed system data, if the memory access error is logged during execution of the instruction sequence; setting data returned in response to the memory access request equal to a set of predefined fake data, if the memory access error is logged during execution of the instruction sequence; skipping the polling and raising steps if the data returned in response to the memory access request is not equivalent to the predefined fake data; masking a machine check abort handle; updating pointers, if the memory access error is logged; and re-executing the memory access request, if software so commands.

Within the system of the present invention, memory access errors are stored in an error logging register, hardware generated machine check abort handles are masked, and a memory controller, which responds to memory access errors is under full control of either O/S or application software so that memory access errors are intercepted and responded to without necessitating a system reboot.

The system and method of the present invention are particularly advantageous over the prior art because memory failures in commodity multiprocessor computers can now be responded to and remedied without rebooting the computer. The present invention will succeed in responding to memory errors much more effectively than standard machine check abort handles.

The present invention is particularly applicable to O/S level code which can not otherwise be restarted in response to memory errors without rebooting. When the present invention is incorporated within application level code, the present invention also enables the application to recover from memory errors, instead of otherwise being shut down and restarted.

These and other aspects of the invention will be recognized by those skilled in the art upon review of the detailed description, drawings, and claims set forth below.

DETAILED DESCRIPTION OF THE PREFERRED EMBODIMENT

Figure 1:
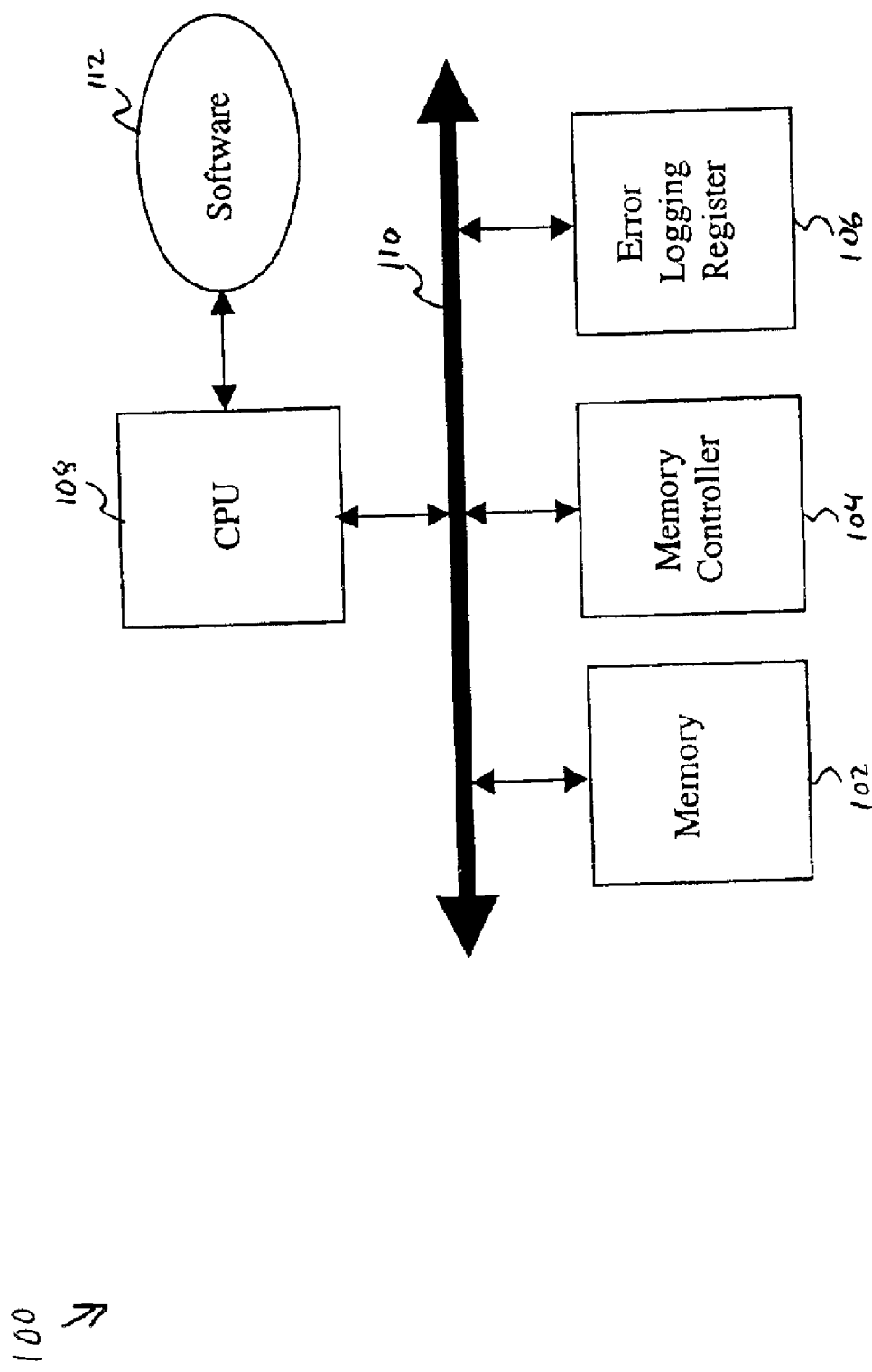
FIG. 1 is a dataflow diagram of a system for recovering from memory access failures.

FIG. 1 is a dataflow diagram of a system 100 for recovering from memory access failures. The system 100 includes a memory 102, a memory controller 104, error logging registers 106, and a central processing unit (CPU) 108, coupled together by a bus 110. The CPU 108 is controlled by software 112. The software 112 is preferably included within the system's 100 operating system, however the software 112 could also be instantiated within an application program as well. The software 112 configures the memory controller 104 and has access to the error registers 106. Operation of the system 100 is discussed with respect to method FIGS. 2, 3, and 4.

Figure 2:
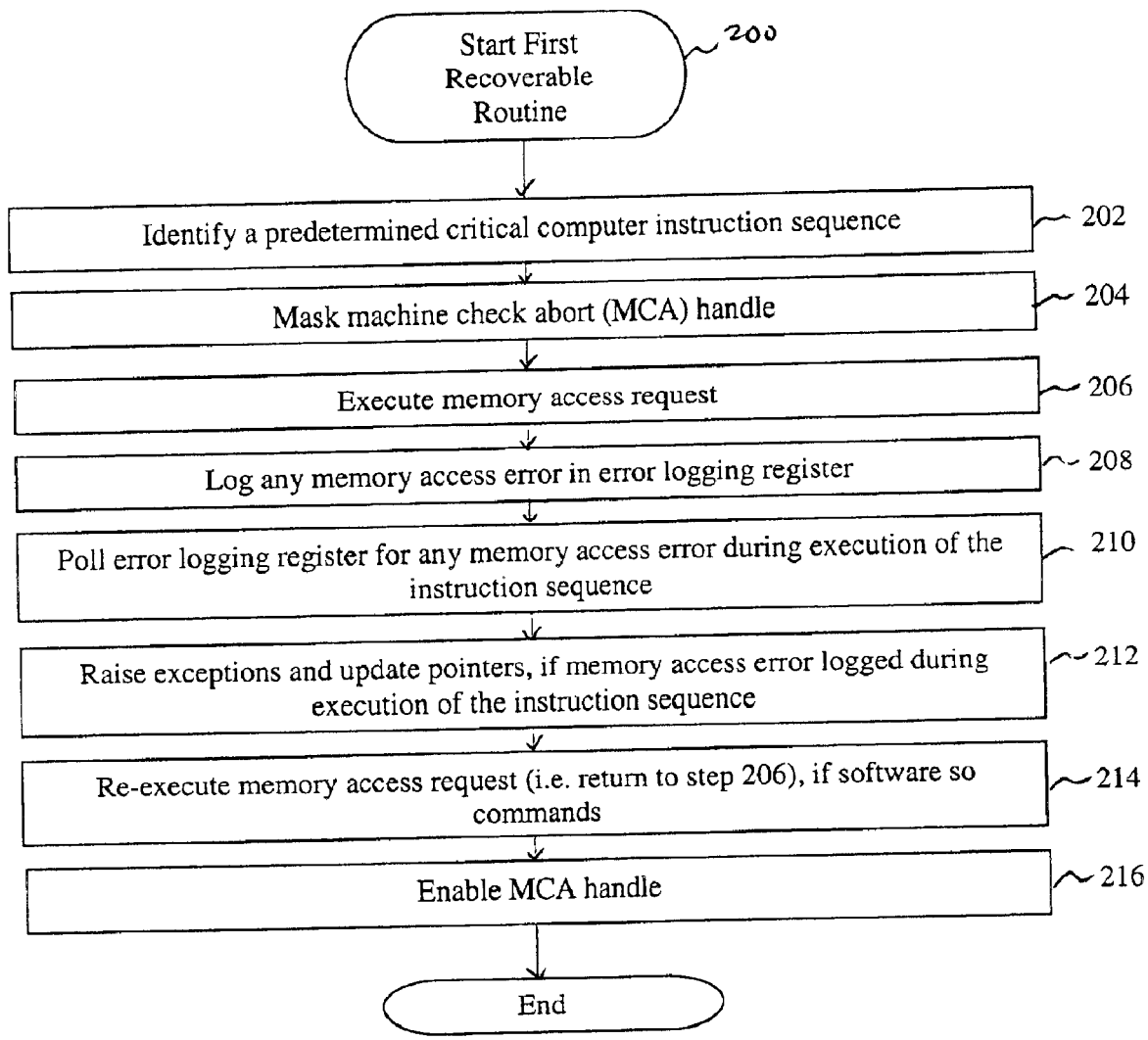
FIG. 2 is a flowchart of a first embodiment of a method for recovering from memory access failures.

FIG. 2 is a flowchart of a first embodiment of a method 200 for recovering from memory access failures. The method 200 begins with step 202 where the software 112 identifies a predetermined critical computer instruction sequence about to be executed by the CPU 108, which includes a memory access request. The predetermined critical computer instruction sequence can be part of a set of instruction sequences, identified by the software 112 designer, for which error recovery is required. While the critical computer instruction sequence discussed below include a memory access request, those skilled in the art will know that concepts discussed with respect to recovery from a memory access request error can be applied to other recovery critical instruction sequences which would otherwise require rebooting of the system 100 to recover from. Thus, the present invention is particularly applicable to O/S level code which can not otherwise be restarted in response to memory errors without rebooting. When the present invention is incorporated within application level code, the present invention enables the application to recover from memory errors, instead of otherwise being shut down and restarted. The present invention may also be used on non-critical computer instruction sequences and for non-memory related errors.

In step 204, the software 112 then instructs the memory controller 104 to mask any raised machine check abort (MCA) handle. Next in step 206, the CPU 108 executes the memory access request. The memory controller 104 logs any memory access error in the error logging register 106, in step 208. Next, in step 210, the software 112 polls the error logging register 106 for any memory access errors, during execution of the instruction sequence.

In step 212, the software 112 raises exceptions and updates pointers, if a memory access error was logged during execution of the instruction sequence. The exceptions perform various diagnostic functions in response to the memory error. The housekeeping functions may include system recovery, memory management, and other reset procedures. Pointers are updated when during memory error diagnosis, there are indications that a portion or sector of the memory 102 may be physically damaged or corrupt.

Depending upon the memory access error which occurred, the software 112 may command the CPU 108 to re-execute the memory access request, in step 214. The software 112 will command the CPU 108 to re-execute the memory access request if the memory access error detected is most likely due to a transitory error condition, which is not likely to occur again. On the other hand, if the memory access error suggest that the memory 102 itself is physically damaged, the software 112 will not instruct the CPU 108 to re-execute the memory access request. In step 216, the software 112 instructs the memory controller 104 to enable the MCA handle.

Figure 3:
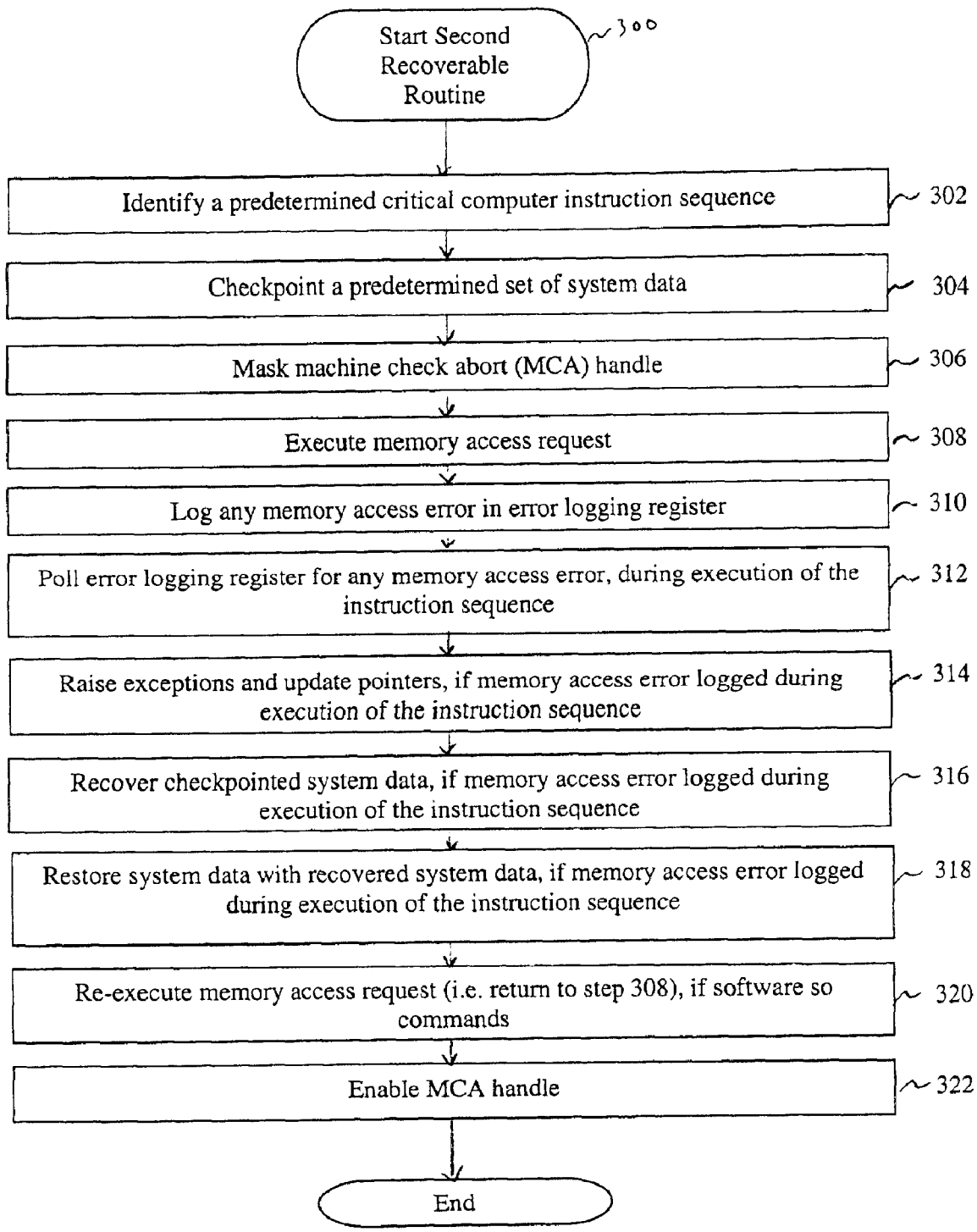
FIG. 3 is a flowchart of a second embodiment of the method for recovering from memory access failures.

FIG. 3 is a flowchart of a second embodiment of the method for recovering from memory access failures. The method 300 begins with step 302 where the software 112 identifies a predetermined critical computer instruction sequence about to be executed by the CPU 108, which includes a memory access request.

In step 304, the software 112 then checkpoints a predetermined set of system data necessary to recover should the memory access request fail. Checkpointing is component of a transactional paradigm in which permanent modifications to system data are not made until all associated operations within the transaction have been successfully committed. Thus if during a transaction, such as the memory access request, an error occurs, the system data stored during the checkpoint can be restored.

In step 306, the software 112 then instructs the memory controller 104 to mask any raised machine check abort (MCA) handle. In step 308, the CPU 108 executes the memory access request. The memory controller 104 logs any memory access error in the error logging register 106, in step 310. Next, in step 312, the software 112 polls the error logging register 106 for any memory access errors, during execution of the instruction sequence. If a memory access error is logged during execution of the instruction sequence, the software 112: raises exceptions and updates pointers, in step 314; recovers the checkpointed system data, in step 316; and restores the system data, in step 318

As discussed above, with reference to FIG. 2, depending upon the memory access error which occurred, the software 112 may command the CPU 108 to re-execute the memory access request, in step 320. In step 322, the software 112 instructs the memory controller 104 to enable the MCA handle.

Figure 4:
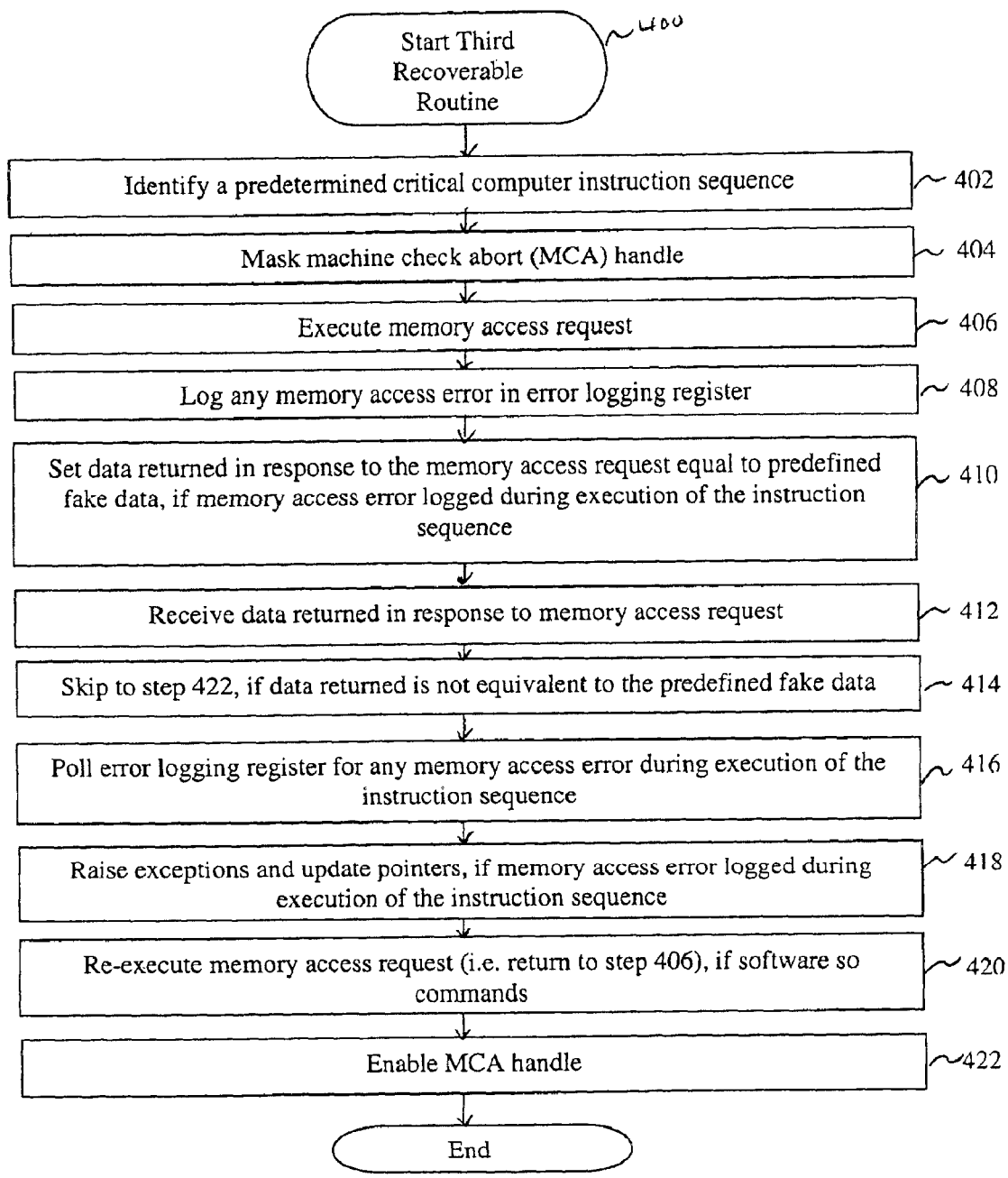
FIG. 4 is a flowchart of a third embodiment of the method for recovering from memory access failures.

FIG. 4 is a flowchart of a third embodiment of the method for recovering from memory access failures. The method 400 begins with step 402 where the software 112 identifies a predetermined critical computer instruction sequence about to be executed by the CPU 108, which includes a memory access request. In step 404, the software 112 then instructs the memory controller 104 to mask any raised machine check abort (MCA) handle. In step 406, the CPU 108 executes the memory access request. The memory controller 104 logs any memory access error in the error logging register 106, in step 408.

In step 410, the memory controller 104 sets data returned in response to the memory access request equal to a set of predefined fake data, if a memory access error is logged during execution of the instruction sequence. The software 112 has preprogrammed the memory controller 104 to perform the functionality described in step 410. By setting the returned data to the predefined fake data in when a memory access error occurs, corrupted data is not returned to the software, which might otherwise necessitate a system reboot.

In step 412, the software 112 receives data returned in response to the memory access request. In step 414, the method 400 skips to step 422, if the data returned in response to the memory access request is not equivalent to the predefined fake data. When the data returned is not equal to the fake data, the software 112 knows that no memory access error has occurred, during execution of the instruction sequence, even though the software 112 has not polled the error logging register. Thus, the polling step can be eliminated, speeding up the memory access request.

In step 416, the software 112 polls the error logging register 106 for any memory access errors, during execution of the instruction sequence. In step 418, the software 112 raises exceptions and updates pointers, if a memory access error was logged during execution of the instruction sequence.

As discussed above, with reference to FIG. 2, depending upon the memory access error which occurred, the software 112 may command the CPU 108 to re-execute the memory access request, in step 420. In step 422, the software 112 instructs the memory controller 104 to enable any hardware raised MCA handles.

Another enhancement which may be applied to each of the three embodiments discussed above, is to batch access to memory in large chunks whenever possible. By batch accessing data, memory access errors are logged and polled for the entire batch. This has implication on a granularity of the system 100 operation and is limited by pointer manipulation.

While one or more embodiments of the present invention have been described, those skilled in the art will recognize that various modifications may be made. Variations upon and modifications to these embodiments are provided by the present invention, which is limited only by the following claims.

What is claimed is:

1. A method for recoverable programming, comprising the steps of:

identifying a predetermined instruction sequence containing a memory access request;

checkpointing a predetermined set of system data;
executing the memory access request after the checkpointing;
monitoring for memory access errors;
logging any memory access errors in an error logging register;
polling the register for any logged memory access error during execution of the instruction sequence;
raising exceptions, if any memory access error is logged; and
recovering from any memory access error using the checkpointed system data, if the memory access error is logged during execution of the instruction sequence.

2. The method of claim 1, further comprising the steps of:
checkpointing a predetermined set of system data; and
recovering from the memory access error using the checkpointed system data, if the memory access error is logged during execution of the instruction sequence.

3. The method of claim 1, further comprising the step of:
setting data returned in response to the memory access request equal to a set of predefined fake data, if the memory access error is logged during execution of the instruction sequence.

4. The method of claim 3, further comprising the step of:
skipping the polling and raising steps if the data returned in response to the memory access request is not equivalent to the predefined fake data.

5. The method of claim 1, further comprising the step of:
masking a machine check abort handle.

6. The method of claim 5, after the raising step, further comprising the steps of:
enabling the machine check abort handle.

7. The method of claim 1, further comprising the step of:
updating pointers, if the memory access error is logged.

8. The method of claim 1, further comprising the step of:
re-executing the memory access request, if software so commands.

9. A method for recoverable programming, comprising the steps of:
identifying a predetermined instruction sequence;
checkpointing a predetermined set of system data;
masking a machine check abort handle;
monitoring for memory access errors;
logging a memory access error in an error logging register;
polling the register for any logged memory access error during execution of the instruction sequence;
raising exceptions, if the memory access error is logged;
updating pointers, if the memory access error is logged;
recovering from the memory access error using the checkpointed system data, if the memory access error is logged during execution of the instruction sequence;
re-executing the memory access request, if software so commands; and
enabling the machine check abort handle.

10. A computer-usable medium embodying computer program code for commanding a computer to perform recoverable programming, comprising the steps of:
identifying a predetermined instruction sequence containing a memory access request;
checkpointing a predetermined set of system data;
executing the memory access request after the checkpointing;
monitoring for memory access errors;
logging any memory access errors in an error logging register;
polling the register for any logged memory access error during execution of the instruction sequence;
raising exceptions, if any memory access error is logged; and
recovering from any memory access error using the checkpointed system data, if the memory access error is logged during execution of the instruction sequence.

11. The medium of claim 10, further comprising the steps of:
checkpointing a predetermined set of system data; and
recovering from the memory access error using the checkpointed system data, if the memory access error is logged during execution of the instruction sequence.

12. The medium of claim 10, further comprising the step of:
setting data returned in response to the memory access request equal to a set of predefined fake data, if the memory access error is logged during execution of the instruction sequence.

13. The medium of claim 10, further comprising the step of:
skipping the polling and raising steps if the data returned in response to the memory access request is not equivalent to the predefined fake data.

14. The medium of claim 10, further comprising the step of:
masking a machine check abort handle.

15. A system for recoverable programming, comprising:
means for identifying a predetermined instruction sequence containing a memory access request;
means for checkpointing a predetermined set of system data;
means for executing the memory access request after the checkpointing;
means for monitoring for memory access errors;
means for logging any memory access errors in an error logging register;
means for polling the register for any logged memory access error during execution of the instruction sequence;
means for raising exceptions, if any memory access error is logged; and
means for recovering from any memory access error using the checkpointed system data, if the memory access error is longed during execution of the instruction sequence.

16. The system of claim 15, further comprising:
means for checkpointing a predetermined set of system data; and
means for recovering from the memory access error using the checkpointed system data, if the memory access error is logged during execution of the instruction sequence.

17. The system of claim 15, further comprising:
means for setting data returned in response to the memory access request equal to a set of predefined fake data, if the memory access error is logged during execution of the instruction sequence.

18. The system of claim 17, further comprising:
means for bypassing the means for polling and means for raising if the data returned in response to the memory access request is not equivalent to the predefined fake data.

19. The system of claim 15, further comprising the step of:

means for masking a machine check abort handle.

20. A method for recoverable programming, comprising the steps of:

identifying a predetermined instruction sequence;

monitoring for memory access errors;

logging a memory access error in an error logging register;

polling the register for any logged memory access error during execution of the instruction sequence;

raising exceptions, if the memory access error is logged; and setting data returned in response to the memory access request equal to a set of predefined fake data, if the memory access error is logged during execution of the instruction sequence.

21. The method of claim 20, further comprising the step of:

skipping the polling and raising steps if the data returned in response to the memory access request is not equivalent to the predefined fake data.

22. A computer-usable medium embodying computer program code for commanding a computer to perform recoverable programming, comprising the steps of:

identifying a predetermined instruction sequence;

monitoring for memory access errors;

logging a memory access error in an error logging register;

polling the register for any logged memory access error during execution of the instruction sequence;

raising exceptions, if the memory access error is logged; and setting data returned in response to the memory access request equal to a set of predefined fake data, if the memory access error is logged during execution of the instruction sequence.

23. The medium of claim 22, further comprising the step of:

skipping the polling and raising steps if the data returned in response to the memory access request is not equivalent to the predefined fake data.

24. A system for recoverable programming, comprising:

means for identifying a predetermined instruction sequence;

means for monitoring for memory access errors;

means for logging a memory access error in an error logging register;

means for polling the register for any logged memory access error during execution of the instruction sequence;

means for raising exceptions, if the memory access error is logged; and means for setting data returned in response to the memory access request equal to a set of predefined fake data, if the memory access error is logged during execution of the instruction sequence.

25. The system of claim 24, further comprising:

means for bypassing the means for polling and means for raising if the data returned in response to the memory access request is not equivalent to the predefined fake data.

* * * * *

UNITED STATES PATENT AND TRADEMARK OFFICE
CERTIFICATE OF CORRECTION

PATENT NO. : 6,851,074 B2  
APPLICATION NO. : 09/845469  
DATED : February 1, 2005  
INVENTOR(S) : Dejan Milojicic It is certified that error appears in the above-identified patent and that said Letters Patent is hereby corrected as shown below:

Title Page, item [75]  
First inventors name should be Dejan MILOJICIC.

Signed and Sealed this

Twenty-second Day of July, 2008

JON W. DUDAS  
*Director of the United States Patent and Trademark Office*